(12) United States Patent
Chen et al.

(10) Patent No.: US 9,410,672 B2
(45) Date of Patent: Aug. 9, 2016

(54) LENS, LIGHT EMITTING DEVICE AND BACKLIGHT MODULE

(71) Applicant: HON HAI PRECISION INDUSTRY CO., LTD., New Taipei (TW)

(72) Inventors: Chao-Yu Chen, New Taipei (TW); Cheng-Hung Hsing, New Taipei (TW); Te-Lun Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 77 days.

(21) Appl. No.: 14/553,438

(22) Filed: Nov. 25, 2014

(65) Prior Publication Data

US 2016/0061409 A1 Mar. 3, 2016

Related U.S. Application Data

(63) Continuation of application No. 62/043,299, filed on Aug. 28, 2014.

(51) Int. Cl.
| | |
|---|---|
| *F21V 5/04* | (2006.01) |
| *F21V 9/00* | (2015.01) |
| *G02B 19/00* | (2006.01) |
| *F21Y 101/02* | (2006.01) |
| *G02F 1/1335* | (2006.01) |

(52) U.S. Cl.
CPC . *F21V 5/048* (2013.01); *F21V 5/04* (2013.01); *F21V 9/00* (2013.01); *G02B 19/0061* (2013.01); *G02B 19/0066* (2013.01); *F21Y 2101/02* (2013.01); *G02F 2001/133607* (2013.01)

(58) Field of Classification Search
CPC ............. F21V 5/04; F21V 5/048; F21V 9/00; G02B 19/0066; G02B 19/0061; G02F 2001/133607
See application file for complete search history.

(56) References Cited

U.S. PATENT DOCUMENTS

| | | | | |
|---|---|---|---|---|
| 7,348,723 B2* | 3/2008 | Yamaguchi | ............... | G02B 3/04 257/E33.073 |
| 7,798,679 B2* | 9/2010 | Kokubo | ............. | G02B 19/0061 362/334 |
| 8,613,532 B2* | 12/2013 | Fujii | .................. | G02B 27/0955 362/311.02 |
| 9,157,607 B2* | 10/2015 | Wang | ....................... | F21V 13/04 |
| 2011/0164426 A1* | 7/2011 | Lee | .................... | G02B 19/0061 362/335 |
| 2012/0268950 A1* | 10/2012 | Parkyn | ...................... | F21V 5/04 362/335 |

* cited by examiner

*Primary Examiner* — Alan Cariaso
(74) *Attorney, Agent, or Firm* — ScienBiziP, P.C.

(57) ABSTRACT

A lens includes a light incident surface and a light output surface. The light incident surface includes a first region having points equidistant from the central point of a light emission surface of the light emitting element. The first region satisfies θa≤θ1≤θb, wherein θ1 is a first incident angle of any light emitting from the light emitting element. In a second region with 0°<θ1≤θb+20°, the first incident angle of light having a minimum value of θ2/θ1 is between θa and θb, and θ2/θ1>0.9. In a third region with 0°<θ1≤θb+10°, the first incident angle of light having a minimum value of θ3/θ1 is between θa and θb, and θ3/θ1>0.9. θ2 is a second incident angle of the light of θ1 when traveling in the lens, and θ3 is a third incident angle of the light of θ1 when emitting out of the lens.

18 Claims, 5 Drawing Sheets ent of a light emitting device.
LENS, LIGHT EMITTING DEVICE AND BACKLIGHT MODULE

FIELD

The subject matter herein generally relates to optic technologies and, particularly, to a lens, a light emitting device having the lens, and a backlight module having the light emitting device.

BACKGROUND

With ongoing developments in display technology, a backlight module using a number of light-emitting diodes (LEDs) as light emitting devices for irradiating a liquid crystal display (LCD) has become widely used in a variety of consumer electronic devices, such as cellular telephones, computers, digital cameras, personal digital assistants (PDAs), and the like. The LEDs in the backlight module are arranged in a matrix manner in a tabular region having substantially the same shape as a panel of the LCD. The backlight module performs planar irradiation to the LCD from a back side of the LCD, with light from the LEDs. In the backlight module, a brightness distribution of light has been made substantially uniform by a lens.

BRIEF DESCRIPTION OF THE DRAWINGS

Implementations of the present technology will now be described, by way of example only, with reference to the attached figures.

DETAILED DESCRIPTION

Figure 1:
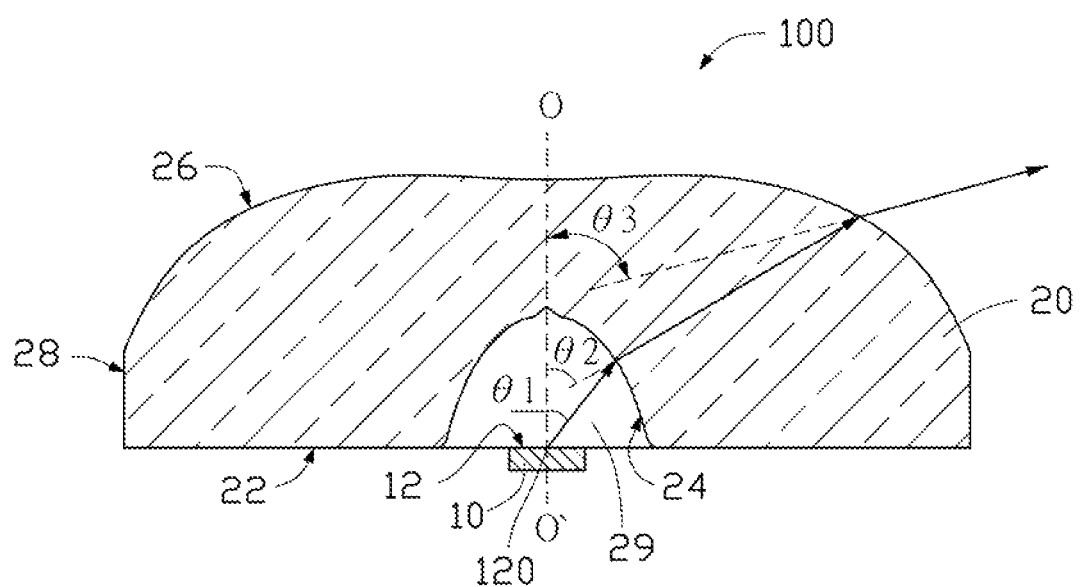
FIG. 1 is a cross sectional view of a first example embodiment of a light emitting device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, substantially cylindrical means that the object resembles a cylinder, but can have one or more deviations from a true cylinder. The term "comprising," means "including, but not necessarily limited to" and specifically indicates open-ended inclusion or membership in the so-described combination, group, series and the like.

The present disclosure is described in relation to a lens for controlling light emitting from a light emitting element. The lens includes a light incident surface and a light output surface. The light incident surface is configured for entrance of the light emitting from the light emitting element into the lens. The light incident surface includes a first region having points equidistant from the central point of a light emission surface of the light emitting element. The first region satisfies $\theta a \leq \theta 1 \leq \theta b$, wherein $\theta 1$ is a first incident angle of any light emitting from the light emitting element, $\theta a$ is the minimum value of the first incident angle in the first region, and $\theta b$ is the maximum value of first incident angle in the first region. The light output surface faces the light incident surface and is configured for radiation of the light from the light emitting element out of the lens. The light incident surface and the light output surface satisfy the following conditions (1) and (2). Condition (1): in a second region of the light incident surface satisfying $0°<\theta 1 \leq \theta b+20°$, the first incident angle of light which emits from the light emitting element and has a minimum value of $\theta 2/\theta 1$ is in a range from $\theta a$ to $\theta b$, and $\theta 2/\theta 1 > 0.9$, where $\theta 2$ is a second incident angle of the light of $\theta 1$ when traveling in the lens. Condition (2): in a third region of the light incident surface satisfying $0°<\theta 1 \leq \theta b+10°$, the first incident angle of light which emits from the light emitting element and has a minimum value of $\theta 3/\theta 1$ is in a range from $\theta a$ to $\theta b$, and $\theta 3/\theta 1 > 0.9$, where $\theta 3$ is a third incident angle of the light of $\theta 1$ when emitting out of the light output surface. As used herein, "incident angle" is defined as the angle with respect to a central axis of the light emitting element. Therefor light traveling along the central axis of the light emitting element has an incident angle of zero degrees.

The present disclosure is described in relation to a light emitting device. The light emitting device includes a light emitting element and a lens. The lens includes a light incident surface and a light output surface. The light incident surface is configured for entrance of the light emitting from the light emitting element into the lens. The light incident surface includes a first region having points equidistant from the central point of a light emission surface of the light emitting element. The first region satisfies $\theta a \leq \theta 1 \leq \theta b$, wherein $\theta 1$ is a first incident angle of any light emitting from the light emitting element, $\theta a$ is the minimum value of the first incident angle in the first region, and $\theta b$ is the maximum value of first incident angle in the first region. The light output surface faces the light incident surface and is configured for radiation of the light from the light emitting element out of the lens. The light incident surface and the light output surface satisfy the following conditions (1) and (2). Condition (1): in a second region of the light incident surface satisfying $0°<\theta 1 \leq \theta b+20°$, the first incident angle of light which emits from the light emitting element and has a minimum value of $\theta 2/\theta 1$ is in a range from $\theta a$ to $\theta b$, and $\theta 2/\theta 1 > 0.9$, where $\theta 2$ is a second incident angle of the light of $\theta 1$ when traveling in the lens. Condition (2): in a third region of the light incident surface satisfying $0°<\theta 1 \leq \theta b+10°$, the first incident angle of light which emits from the light emitting element and has a minimum value of $\theta 3/\theta 1$ is in a range from $\theta a$ to $\theta b$, and $\theta 3/\theta 1 > 0.9$, where $\theta 3$ is a third incident angle of the light of $\theta 1$ when emitting out of the light output surface. The light emitting from the light emitting element emits out of the lens from the light output surface after traveling within the lens.

The present disclosure is described in relation to a backlight module. The backlight module includes a circuit board, a plurality of light emitting devices, and a diffusion plate. Each light emitting device includes a light emitting element electrically connected to the circuit board and a lens. The lens includes a light incident surface and a light output surface. The light incident surface is configured for entrance of the light emitting from the light emitting element into the lens. The light incident surface includes a first region having points equidistant from the central point of a light emission surface of the light emitting element. The first region satisfies $\theta a \leq \theta 1 \leq \theta b$, wherein $\theta 1$ is a first incident angle of any light emitting from the light emitting element, $\theta a$ is the minimum value of the first incident angle in the first region, and $\theta b$ is the maximum value of first incident angle in the first region. The light output surface faces the light incident surface and is configured for radiation of the light from the light emitting element out of the lens. The light incident surface and the light output surface satisfy the following conditions (1) and (2). Condition (1): in a second region of the light incident surface satisfying $0° < \theta 1 \leq \theta b + 20°$, the first incident angle of light which emits from the light emitting element and has a minimum value of $\theta 2/\theta 1$ is in a range from $\theta a$ to $\theta b$, and $\theta 2/\theta 1 > 0.9$, where $\theta 2$ is a second incident angle of the light of $\theta 1$ when traveling in the lens. Condition (2): in a third region of the light incident surface satisfying $0° < \theta 1 \leq \theta b + 10°$, the first incident angle of light which emits from the light emitting element and has a minimum value of $\theta 3/\theta 1$ is in a range from $\theta a$ to $\theta b$, and $\theta 3/\theta 1 > 0.9$, where $\theta 3$ is a third incident angle of the light of $\theta 1$ when emitting out of the light output surface. The light emitting from the light emitting element emits out of the lens from the light output surface after traveling within the lens. The diffusion plate is aligned with the light emitting devices for diffusing and transmitting light emitting out of the light output surface of each light emitting device.

FIG. 1 illustrates a first example embodiment of a light emitting device 100. The light emitting device 100 includes a light emitting element 10 and a lens 20. The lens 20 is positioned above the light emitting element 10 and is configured for controlling light emitting from the light emitting element 10.

The light emitting element 10 is a LED and is configured for emitting light toward the lens 20. The light emitting element 10 includes a light emission surface 12 facing the lens 20. The light emission surface 12 has a central point 120 in a central portion thereof and defines a central axis OO' passing through the central point 120.

The lens 20 can be made of transparent material, such as plastic or glass. The lens 20 includes bottom surface 22, a light incident surface 24, a light output surface 26, and a connecting surface 28. The lens 20 defines a recess 29. The bottom surface 22 and the light output surface 26 are positioned at opposite sides of the lens 20. The light incident surface 24 is positioned between the bottom surface 22 and the light output surface 26 to form the recess 29. The connecting surface 28 is interconnected between the bottom surface 22 and the light output surface 26. In this embodiment, the light emitting element 10 is positioned under the recess 29. The light emission surface 12 faces the light incident surface 24. In this embodiment, the lens 20 is coaxial with the light emitting element 10. The light incident surface 24 is axisymmetrical with respect to the central axis OO', and the light output surface 26 is axisymmetrical with respect to the central axis OO'.

When in use, light emitting from the light emitting element 10 emits toward the light incident surface 24, and then travels in the lens 20, and finally emits out of the lens 20 through the light output surface 26.

Figure 2:
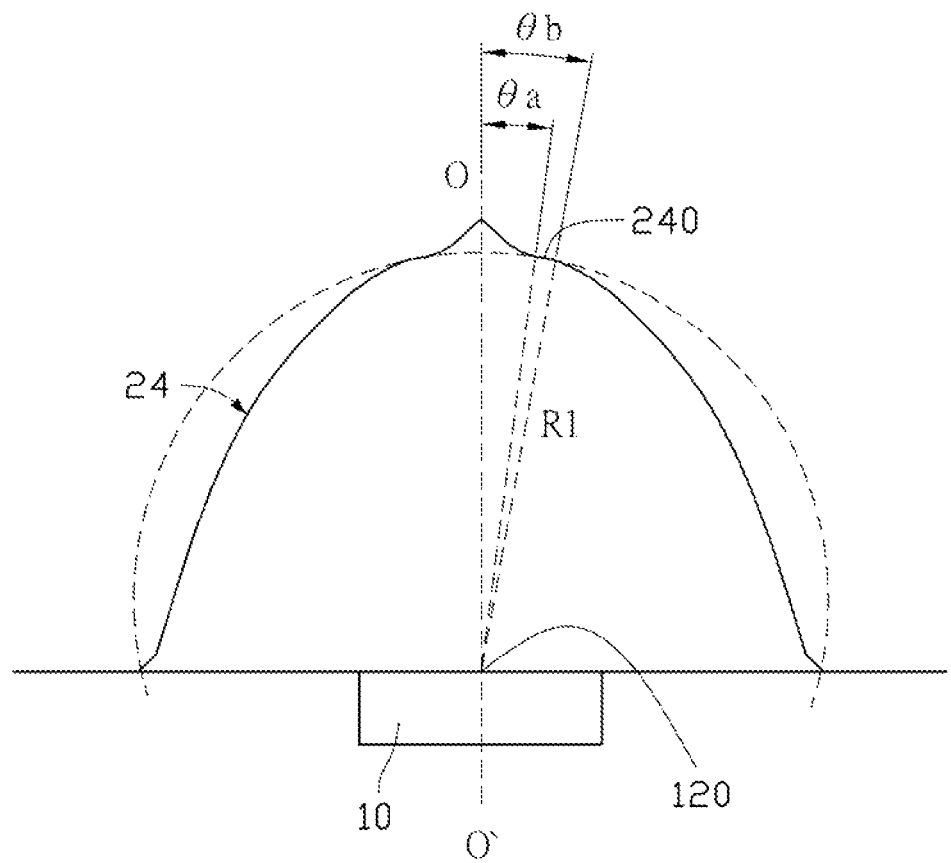
FIG. 2 is a diagrammatic view showing a light incident surface and a light emitting element of the light emitting device of FIG. 1.

FIG. 2 illustrates that the light incident surface 24 includes a first region 240, a second region, a third region, and a fourth region. The first region 240 has points which are equidistant from the central point 120. The first region 240 satisfies the following formula: $\theta a \leq \theta 1 \leq \theta b$, wherein $\theta 1$ is a first incident angle of any light emitting from the light emitting element 10 shown in FIG. 1. In other words, $\theta 1$ is an included angle between any light emitting from the light emitting element 10 and the central axis OO'. $\theta a$ is the minimum value of the first incident angle in the first region 240 shown in FIG. 2, and $\theta b$ is the maximum value of first incident angle in the first region 240 shown in FIG. 1. The second region satisfies the following formula: $0° < \theta 1 \leq \theta b + 20°$. The third region satisfies the following formula: $0° < \theta 1 \leq \theta b + 10°$. The fourth region satisfies the following formula: $0° < \theta 1 \leq \theta max$. In this embodiment, the first region 240 is a spherical surface. For example, all of the points in the first region 240 are equidistant from the central point 120. In another embodiment, the first region 240 could be tangent to a sphere centered on the central point 120, so that points of the first region 240 would be equidistant from the central point 120 where the first region 240 would be tangent to the sphere.

Figure 3:
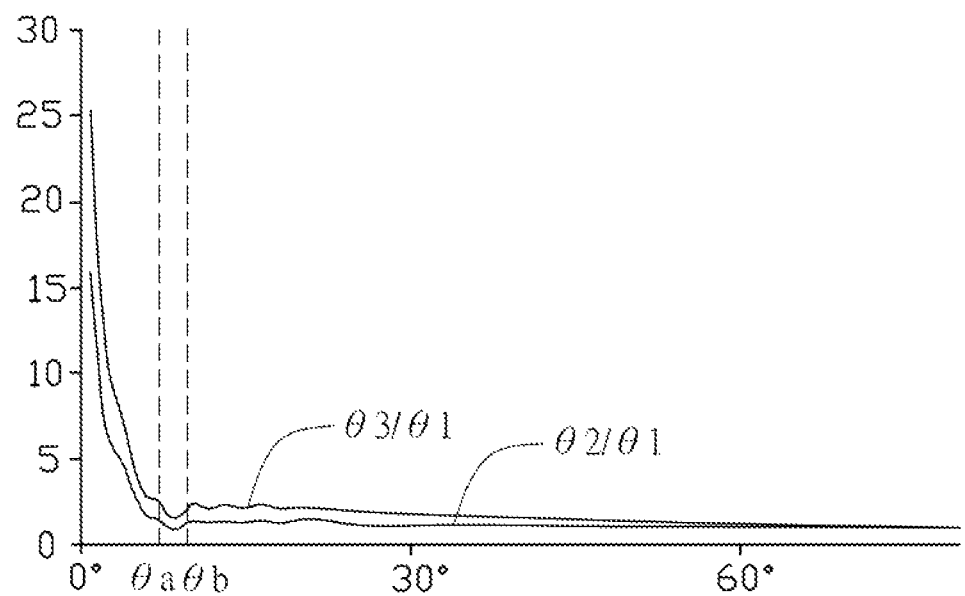
FIG. 3 is a diagram illustrating a relation between a first incident angle and a ratio which is between a second incident angle and the first incident angle or between a third incident angle and the first incident angle.

FIG. 3 illustrates that the light incident surface 24 and the light output surface 26 satisfy the following conditions (1) and (2):

Condition (1): in the second region satisfying $0° < \theta 1 \leq \theta b + 20°$, the first incident angle of light which emits from the light emitting element 10 and has a minimum value of $\theta 2/\theta 1$ is in a range from $\theta a$ to $\theta b$, and $\theta 2/\theta 1 > 0.9$, where $\theta 2$ is a second incident angle of the light of $\theta 1$ when traveling in the lens 20. In other words, $\theta 2$ is an included angle between the light of $\theta 1$ traveling in the lens 20 and the central axis OO'. For example, the minimum value of $\theta 2/\theta 1$ occurs for $\theta 1$ in a range from $\theta a = 7°$ to $\theta b = 10°$ and the minimum value is less than 1.1 and preferably is 1.0. Condition (2): in the third region satisfying $0° < \theta 1 \leq \theta b + 10°$, the first incident angle of light which emits from the light emitting element 10 and has a minimum value of $\theta 3/\theta 1$ is in a range from $\theta a$ to $\theta b$, and $\theta 3/\theta 1 > 0.9$, where $\theta 3$ is a third incident angle of the light of $\theta 1$ when emitting out of the light output surface 26. In other words, $\theta 3$ is an included angle between the light of $\theta 1$ emitting out of the light output surface 26 and the central axis OO'.

Figure 4:
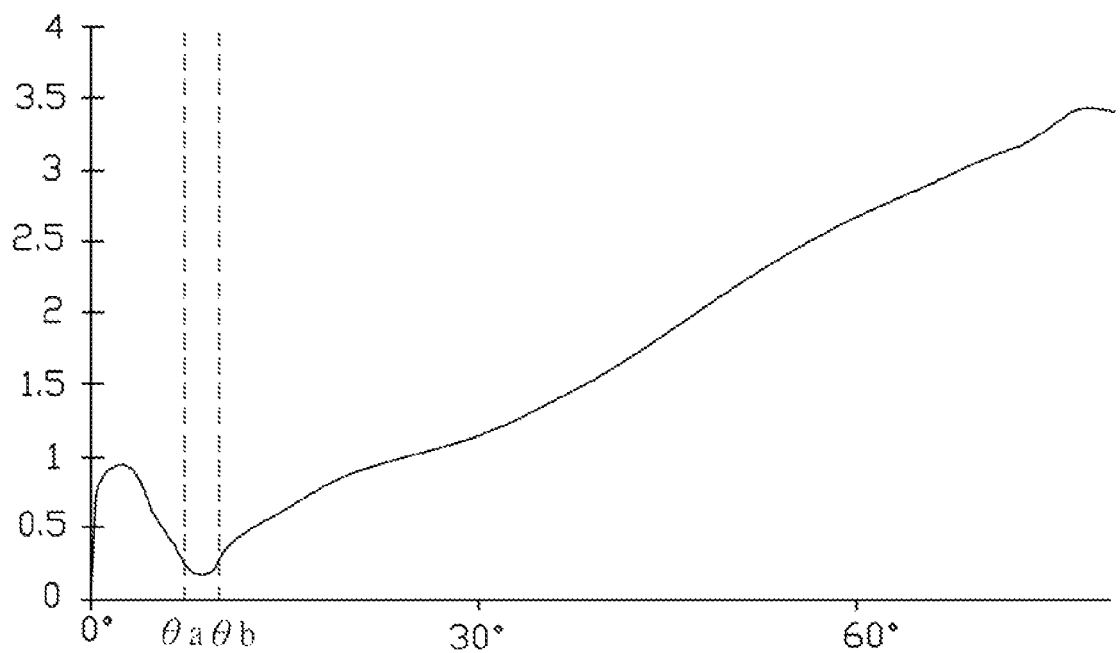
FIG. 4 is a diagram illustrating a relation between the first incident angle and absolute values of slopes of tangents of the light incident surface.

FIG. 4 illustrates that the fourth region has a turning point 41 whose tangent has a minimum absolute value of slope. As used herein, "slope" is defined with respect to the central axis of the light emitting element, such that a surface perpendicular to the central axis has a slope of zero. At the turning point 41, the absolute magnitude of the slope turns from a decreasing function of the first incident angle $\theta 1$ for $\theta 1 < \theta a$ to an increasing function of the first incident angle $\theta 1$ for $\theta 1 > \theta b$. In the example, the first incident angle of light impinged on the turning point is in a range from $\theta a$ to $\theta b$, and the light with the first incident angle of $\theta max$ emits out of an outmost side of the light output surface. In this example, $\theta max$ is 90°.

Figure 5:
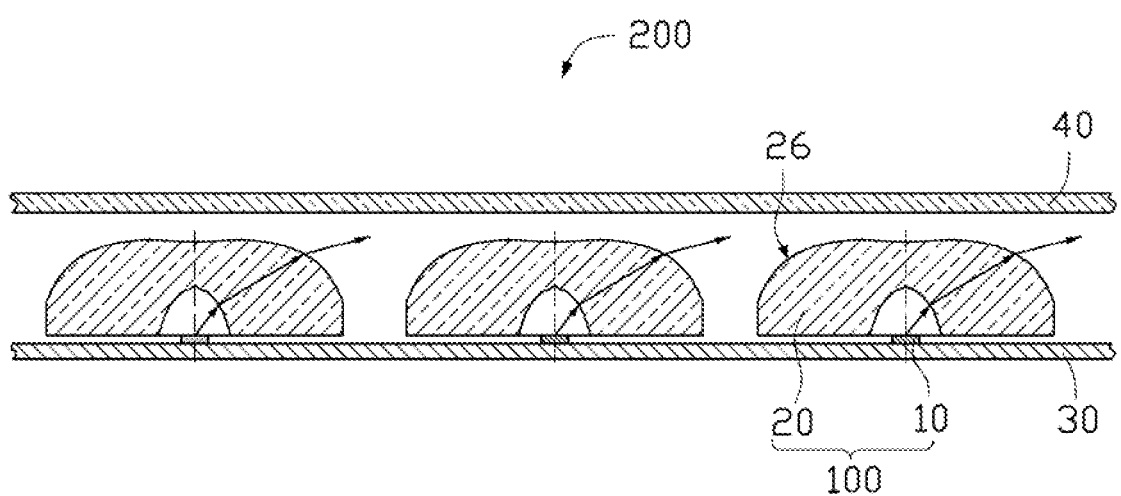
FIG. 5 is a cross sectional view of a first example embodiment of a backlight module.

FIG. 5 illustrates a second example embodiment of a backlight module 200. The backlight module 200 includes a circuit board 30, a plurality of light emitting devices 100 of the first embodiment and a diffusion plate 40. The light emitting devices 100 are arranged on the circuit board 30 in a matrix array. In detail, the light emitting element 10 are located on the circuit board 30 and are electrically connected to the circuit board 30. Light emitting from the light emitting element 10 emits out of the lens 20 through the light output surface 26 after traveling within the lens 20. The diffusion plate 40 is aligned with the light emitting devices 100 for diffusing and transmitting light emitting out of the light output surface 26 of each light emitting device 100.

The embodiments shown and described above are only examples. Many details are often found in the art such as the other features of a lens, a light emitting device, and a backlight module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A lens for controlling light emitting from a light emitting element, comprising:
   a light incident surface configured for entrance of the light emitting from the light emitting element into the lens, the light incident surface comprising a first region having points equidistant from a central point of a light emission surface of the light emitting element, the first region satisfying $\theta a \leq \theta 1 \leq \theta b$, wherein $\theta 1$ is a first incident angle of any light emitting from the light emitting element, $\theta a$ is the minimum value of the first incident angle in the first region, and $\theta b$ is the maximum value of first incident angle in the first region; and
   a light output surface facing the light incident surface and configured for radiation of the light from the light emitting element out of the lens;
   wherein the light incident surface and the light output surface satisfy the following conditions (1) and (2):
   condition (1): in a second region of the light incident surface satisfying $0° < \theta 1 \leq \theta b + 20°$, the first incident angle of light which emits from the light emitting element and has a minimum value of $\theta 2/\theta 1$ is in a range from $\theta a$ to $\theta b$, and $\theta 2/\theta 1 > 0.9$, where $\theta 2$ is a second incident angle of the light of $\theta 1$ when traveling in the lens; and condition (2): in a third region of the light incident surface satisfying $0° < \theta 1 \leq \theta b + 10°$, the first incident angle of light which emits from the light emitting element and has a minimum value of $\theta 3/\theta 1$ is in a range from $\theta a$ to $\theta b$, and $\theta 3/\theta 1 > 0.9$, where $\theta 3$ is a third incident angle of the light of $\theta 1$ when emitting out of the light output surface.

2. The lens of claim 1, wherein the light incident surface comprises a fourth region with $0° < \theta 1 \leq \theta max$, the fourth region has a turning point whose tangent has a minimum absolute value of slope, the first incident angle of light impinged on the turning point is in a range from $\theta a$ to $\theta b$, and the light with the first incident angle of $\theta max$ emits out of an outmost side of the light output surface.

3. The lens of claim 2, wherein the light incident surface is axisymmetrical with respect to a central axis of the light emitting element, and the light output surface is axisymmetrical with respect to the central axis of the light emitting element.

4. The lens of claim 2, wherein the lens further comprises a bottom surface and defines a recess, and the light incident surface is positioned between the bottom surface and the light output surface to form the recess.

5. The lens of claim 4, wherein the lens further comprises a connecting surface, and the connecting surface is interconnected between the bottom surface and the light output surface.

6. The lens of claim 1, wherein the first region is a spherical surface.

7. A light emitting device comprising:
   a light emitting element; and
   a lens comprising:
      a light incident surface configured for entrance of the light emitting from the light emitting element into the lens, the light incident surface comprising a first region having points equidistant from a central point of a light emission surface of the light emitting element, the first region satisfying $\theta a \leq \theta 1 \leq \theta b$, wherein $\theta 1$ is a first incident angle of any light emitting from the light emitting element, $\theta a$ is the minimum value of the first incident angle in the first region, and $\theta b$ is the maximum value of first incident angle in the first region; and
   a light output surface facing the light incident surface and configured for radiation of the light from the light emitting element out of the lens;
   wherein the light incident surface and the light output surface satisfy the following conditions (1) and (2):
   condition (1): in a second region of the light incident surface satisfying $0° < \theta 1 \leq \theta b + 20°$, the first incident angle of light which emits from the light emitting element and has a minimum value of $\theta 2/\theta 1$ is in a range from $\theta a$ to $\theta b$, and $\theta 2/\theta 1 > 0.9$, where $\theta 2$ is a second incident angle of that light of $\theta 1$ when traveling in the lens; and condition (2): in a third region of the light incident surface satisfying $0° < \theta 1 \leq \theta b + 10°$, the first incident angle of light which emits from the light emitting element and has a minimum value of $\theta 3/\theta 1$ is in a range from $\theta a$ to $\theta b$, and $\theta 3/\theta 1 > 0.9$, where $\theta 3$ is a third incident angle of the light of $\theta 1$ when emitting out of the light output surface, and the light emitting from the light emitting element emits out of the lens from the light output surface after traveling within the lens.

8. The light emitting device of claim 7, wherein the light incident surface comprises a fourth region with $0° < \theta 1 \leq \theta \theta max$, the fourth region has a turning point whose tangent has a minimum absolute value of slope, the first incident angle of light impinged on the turning point is in a range from $\theta a$ to $\theta b$, and the light with the first incident angle of $\theta max$ emits out of an outmost side of the light output surface.

9. The light emitting device of claim 8, wherein the light incident surface is axisymmetrical with respect to a central axis of the light emitting element, and the light output surface is axisymmetrical with respect to the central axis of the light emitting element.

10. The light emitting device of claim 8, wherein the lens further comprises a bottom surface and defines a recess, and the light incident surface is positioned between the bottom surface and the light output surface to form the recess.

11. The light emitting device of claim 10, wherein the lens further comprises a connecting surface, and the connecting surface is interconnected between the bottom surface and the light output surface.

12. The light emitting device of claim 7, wherein the first region is a spherical surface.

13. A backlight module comprising:

a circuit board;

a plurality of light emitting devices arranged in a matrix array on the circuit board, each light emitting device comprising:

a light emitting element electrically connected to the circuit board; and a lens comprising:

a light incident surface configured for entrance of the light emitting from the light emitting element into the lens, the light incident surface comprising a first region having points equidistant from the central point of a light emission surface of the light emitting element, the first region satisfying $\theta a \leq \theta 1 \leq \theta b$, wherein $\theta 1$ is a first incident angle of any light emitting from the light emitting element, $\theta a$ is the minimum value of the first incident angle in the first region, and $\theta b$ is the maximum value of first incident angle in the first region; and a light output surface facing the light incident surface and configured for radiation of the light from the light emitting element out of the lens;

wherein the light incident surface and the light output surface satisfy the following conditions (1) and (2):

condition (1): in a second region of the light incident surface satisfying $0° < \theta 1 \leq \theta b + 20°$, the first incident angle of light which emits from the light emitting element and has a minimum value of $\theta 2/\theta 1$ is in a range from $\theta a$ to $\theta b$, and $\theta 2/\theta 1 > 0.9$, where $\theta 2$ is a second incident angle of that light of $\theta 1$ when traveling in the lens; and condition (2): in a third region of the light incident surface satisfying $0° < \theta 1 \leq \theta b + 10°$, the first incident angle of light which emits from the light emitting element and has a minimum value of $\theta 3/\theta 1$ is in a range from $\theta a$ to $\theta b$, and $\theta 3/\theta 1 > 0.9$, where $\theta 3$ is a third incident angle of the light of $\theta 1$ when emitting out of the light output surface, and the light emitting from the light emitting element emits out of the lens through the light output surface after traveling within the lens; and a diffusion plate aligned with the light emitting devices for diffusing and transmitting light emitting out of the light output surface of each light emitting device.

14. The backlight module of claim 13, wherein the light incident surface comprises a fourth region with $0° < \theta 1 \leq \theta max$, the fourth region has a turning point whose tangent has a minimum absolute value of slope, the first incident angle of light impinged on the turning point is in a range from $\theta a$ to $\theta b$, and the light with the first incident angle of $\theta max$ emits out of an outmost side of the light output surface.

15. The backlight module of claim 14, wherein the light incident surface is axisymmetrical with respect to a central axis of the light emitting element, and the light output surface is axisymmetrical with respect to the central axis of the light emitting element.

16. The backlight module of claim 15, wherein the lens further comprises a bottom surface and defines a recess, and the light incident surface is positioned between the bottom surface and the light output surface to form the recess.

17. The backlight module of claim 16, wherein the lens further comprises a connecting surface, and the connecting surface is interconnected between the bottom surface and the light output surface.

18. The backlight module of claim 14, wherein the first region is a spherical surface.

* * * * *